(12) United States Patent
Maeda et al.

(10) Patent No.: US 11,628,579 B2
(45) Date of Patent: Apr. 18, 2023

(54) ROBOT SYSTEM AND ROBOT

(71) Applicant: Seiko Epson Corporation, Tokyo (JP)

(72) Inventors: Akitoshi Maeda, Shiojiri (JP); Daiki Tokushima, Azumino (JP); Takeru Saeki, Matsumoto (JP)

(73) Assignee: SEIKO EPSON CORPORATION

( * ) Notice: Subject to any disclaimer, the term of this patent is extended or adjusted under 35 U.S.C. 154(b) by 289 days.

(21) Appl. No.: 16/827,811

(22) Filed: Mar. 24, 2020

(65) Prior Publication Data

US 2020/0307000 A1 Oct. 1, 2020

(30) Foreign Application Priority Data

Mar. 25, 2019 (JP) ................ JP2019-057446

(51) Int. Cl.
| | | |
|---|---|---|
| *B25J 9/12* | (2006.01) | |
| *B25J 19/00* | (2006.01) | |
| *B25J 9/16* | (2006.01) | |
| *B25J 9/06* | (2006.01) | |

(52) U.S. Cl.
CPC ............ *B25J 19/0025* (2013.01); *B25J 9/12* (2013.01); *B25J 9/161* (2013.01); *B25J 9/06* (2013.01)

(58) Field of Classification Search
CPC ............ B25J 9/0025; B25J 9/12; B25J 9/161
See application file for complete search history.

(56) References Cited

U.S. PATENT DOCUMENTS

| | | | | |
|---|---|---|---|---|
| 10,654,170 | B2* | 5/2020 | Hara | ............... B25J 19/025 |
| 2014/0214201 | A1* | 7/2014 | Takemoto | ........... B25J 9/1674 |
| | | | | 700/245 |
| 2016/0116307 | A1* | 4/2016 | Maeda | ............... G01D 5/341 |
| | | | | 901/23 |
| 2018/0281198 | A1* | 10/2018 | Hara | .................. B25J 13/00 |
| 2018/0335327 | A1 | 11/2018 | Minami et al. | |

FOREIGN PATENT DOCUMENTS

| | | |
|---|---|---|
| JP | S63-298403 A | 12/1988 |
| JP | H05-266391 A | 10/1993 |
| JP | 2004-032916 A | 1/2004 |
| JP | 2012-161880 A | 8/2012 |
| JP | 2018-194509 A | 12/2018 |

\* cited by examiner

*Primary Examiner* — William C Joyce
(74) *Attorney, Agent, or Firm* — Harness, Dickey & Pierce, P.L.C.

(57) ABSTRACT

A robot system includes a robot, a controller that controls actuation of the robot, and a first external device, wherein the robot has a first member, a second member that pivots relative to the first member, a motor that generates drive power for pivoting the second member relative to the first member, an encoder including a detection unit that detects an amount of rotation of the motor, a control unit that controls actuation of the detection unit, a communication unit that communicates with the controller, and a first device connecting part connected to the first external device, the control unit connected to the detection unit, the communication unit, and the first device connecting part, and a first communication line connecting the communication unit and the controller, and data of the first external device is transmitted to the controller via the first device connecting part and the first communication line.

4 Claims, 10 Drawing Sheets

ROBOT SYSTEM AND ROBOT

The present application is based on, and claims priority from JP Application Serial Number 2019-057446, filed Mar. 25, 2019, the disclosure of which is hereby incorporated by reference herein in its entirety.

BACKGROUND

1. Technical Field

The present disclosure relates to a robot system and a robot.

2. Related Art

In a robot, for example, an end effector including a hand is attached to the distal end thereof. The end effector is electrically coupled to a controller of the robot via wiring.

On the other hand, the robot has a plurality of arms, and drive devices including motors that generate drive power for pivoting the arms and encoders that detect pivot states are provided in pivot shafts of the respective arms. In this regard, the wiring coupling the end effector and the controller is laid inside of the robot.

For example, JP-A-2012-161880 discloses laying of a signal line and a power line coupling an end effector and an end effector control unit inside of a robot.

On the other hand, also, wiring coupling the drive devices and the controller is laid inside of the robot. Accordingly, when the wiring coupling the end effector and the controller is laid, the number of wires laid inside of the robot is larger. Then, it is necessary to secure a space for passing the wires, and there is a problem that the degree of freedom of design of the robot is lower.

SUMMARY

A robot system according to an application example of the present disclosure is a robot system including a robot, a controller that controls actuation of the robot, and a first external device, wherein the robot includes a first member, a second member that pivots relative to the first member, a motor that generates drive power for pivoting the second member relative to the first member, an encoder including a detection unit that detects an amount of rotation of the motor, a control unit that controls actuation of the detection unit, a communication unit that communicates with the controller, and a first device connecting part connected to the first external device, the control unit connected to the detection unit, the communication unit, and the first device connecting part, and a first communication line connecting the communication unit and the controller, and the robot system transmits data of the first external device to the controller via the first device connecting part and the first communication line.

DESCRIPTION OF EXEMPLARY EMBODIMENTS

As below, preferred embodiments of the robot system and the robot according to the present disclosure will be explained in detail with reference to the accompanying drawings.

First Embodiment

First, a robot system according to a first embodiment is explained.

Figure 1:
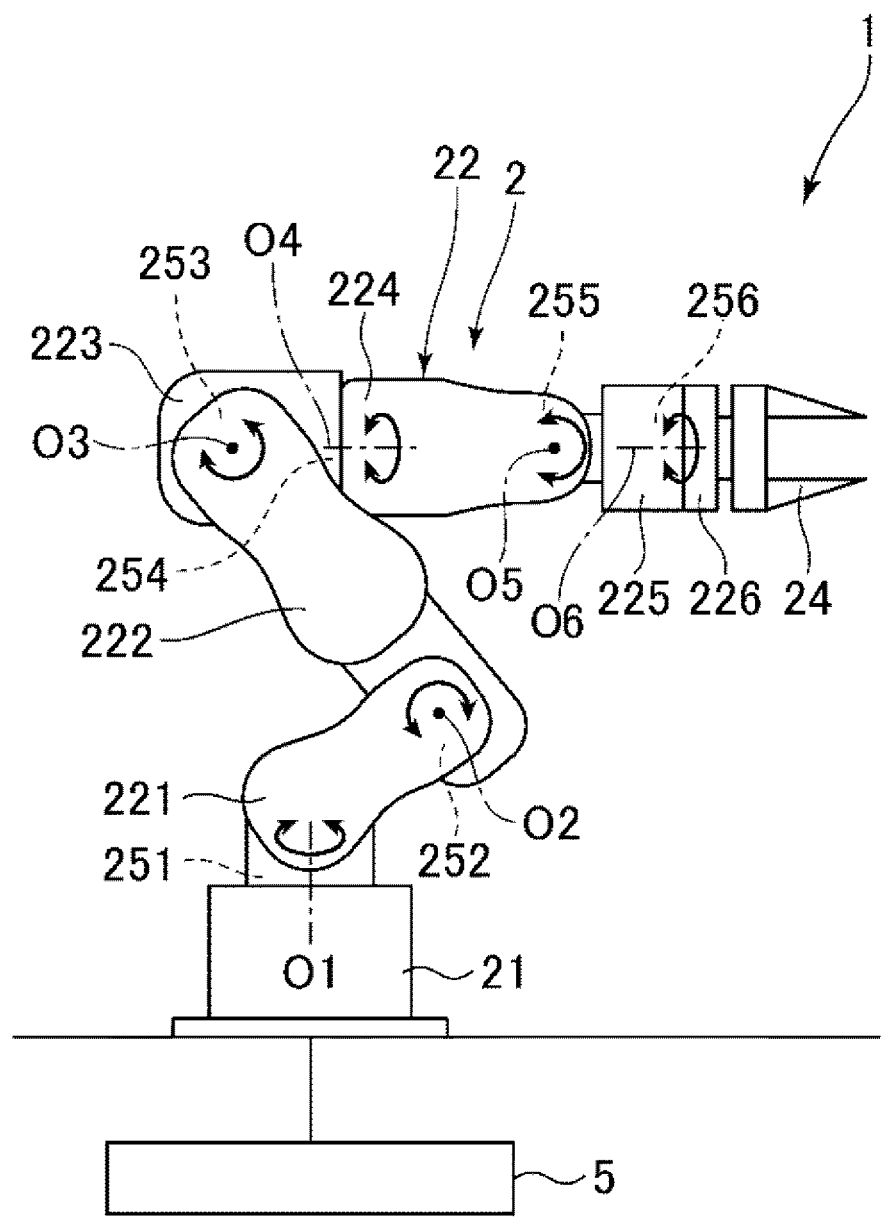
FIG. 1 is a side view showing a robot system according to a first embodiment.
Figure 2:
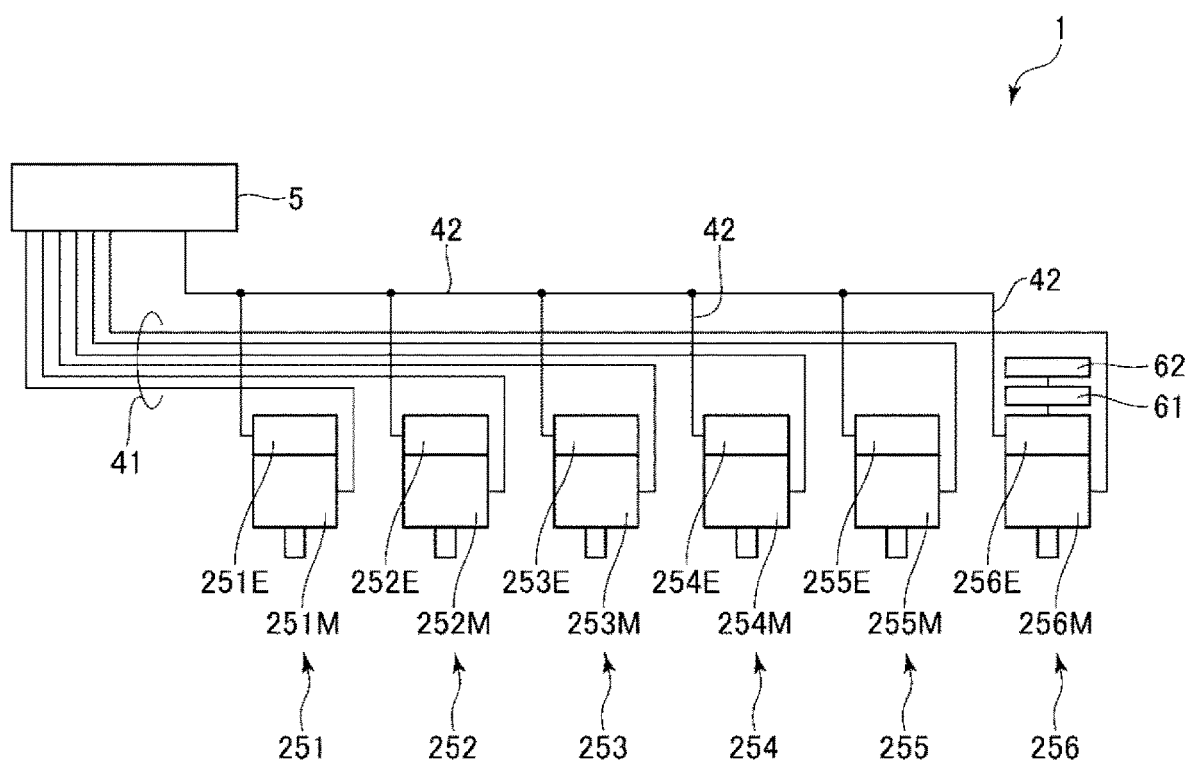
FIG. 2 is a functional block diagram of the robot system shown in FIG. 1.

FIG. 1 is the side view showing the robot system according to the first embodiment. FIG. 2 is the functional block diagram of the robot system shown in FIG. 1.

A robot system 1 shown in FIG. 1 has a robot 2 and a controller 5 that controls actuation of the robot 2. The application of the robot system 1 is not particularly limited to, but includes e.g. feed, removal, transport, assembly, etc. of objects including precision apparatuses and components forming the apparatuses.

The robot 2 shown in FIG. 1 includes a base 21 and a robot arm 22 pivotably coupled to the base 21.

The base 21 is fixed onto a placement part including e.g. a floor, wall, ceiling, and movable platform.

The robot arm 22 has an arm 221 coupled to the base 21 pivotably about a first axis O1, an arm 222 coupled to the arm 221 pivotably about a second axis O2, an arm 223 coupled to the arm 222 pivotably about a third axis O3, an arm 224 coupled to the arm 223 pivotably about a fourth axis O4, an arm 225 coupled to the arm 224 pivotably about a fifth axis O5, and an arm 226 coupled to the arm 225 pivotably about a sixth axis O6. Further, an end effector 24 according to work to be executed by the robot 2 is attached to the arm 226.

Note that the robot 2 is not limited to the configuration of the embodiment, but, for example, the number of arms of the robot arm 22 may be one to five, seven, or more. Further, for example, the type of the robot 2 may be a scalar robot or a dual-arm robot having two robot arms 22.

The robot 2 has a drive device 251 that pivots the arm 221 relative to the base 21, a drive device 252 that pivots the arm 222 relative to the arm 221, a drive device 253 that pivots the arm 223 relative to the arm 222, a drive device 254 that pivots the arm 224 relative to the arm 223, a drive device 255 that pivots the arm 225 relative to the arm 224, and a drive device 256 that pivots the arm 226 relative to the arm 225.

The controller 5 respectively independently controls actuation of the drive devices 251 to 256 so that the arms 221 to 226 may be located in target positions. The controller 5 includes e.g. a computer and has a processor (CPU) that processes information, a memory communicably connected to the processor, and an external interface. Various programs that can be executed by the processor are saved in the memory, and the processor may read and execute the various programs stored in the memory.

The drive device 251 has a motor 251M as a drive source and an encoder 251E that detects an amount of rotation of the motor 251M provided inside of the base 21. The drive device 252 has a motor 252M as a drive source and an encoder 252E that detects an amount of rotation of the motor 252M provided inside of the arm 221. The drive device 253 has a motor 253M as a drive source and an encoder 253E that detects an amount of rotation of the motor 253M provided inside of the arm 222. The drive device 254 has a motor 254M as a drive source and an encoder 254E that detects an amount of rotation of the motor 254M provided inside of the arm 223. The drive device 255 has a motor 255M as a drive source and an encoder 255E that detects an amount of rotation of the motor 255M provided inside of the arm 224. The drive device 256 has a motor 256M as a drive source and an encoder 256E that detects an amount of rotation of the motor 256M provided inside of the arm 225.

The motors 251M to 256M and the controller 5 are coupled via power lines 41 that respectively supply power to the motors 251M to 256M. The controller 5 supplies power to the respective motors 251M to 256M and controls driving of the respective motors 251M to 256M.

On the other hand, the encoders 251E to 256E and the controller 5 are connected via first communication lines 42. Thereby, the encoders 251E to 256E and the controller 5 can communicate with each other. Further, the first communication lines 42 form the so-called bus wiring. The bus wiring in this case refers to a wiring form in which the lines are branched and laid from the main line to the respective connection destinations in the connection between the controller 5 and the encoders 251E to 256E as a plurality of connection destinations. In the bus wiring, it is not necessary to respectively directly connect the controller 5 and the encoders 251E to 256E like as star wiring, i.e., a wiring form in which the lines are radially laid from the controller 5 to the plurality of connection destinations. Accordingly, the number of first communication lines 42 passing through the robot arm 22 may be reduced compared to the star wiring.

The robot system 1 according to the embodiment further has a first external device 61 and a second external device 62 provided inside of the arm 225. These first external device 61 and second external device 62 are respectively devices added to the encoder 256E. That is, these first external device 61 and second external device 62 may be installed in advance or post-installed in the robot system 1. As below, the drive device 256 and the first external device 61 and second external device 62 will be described in detail.

Figure 3:
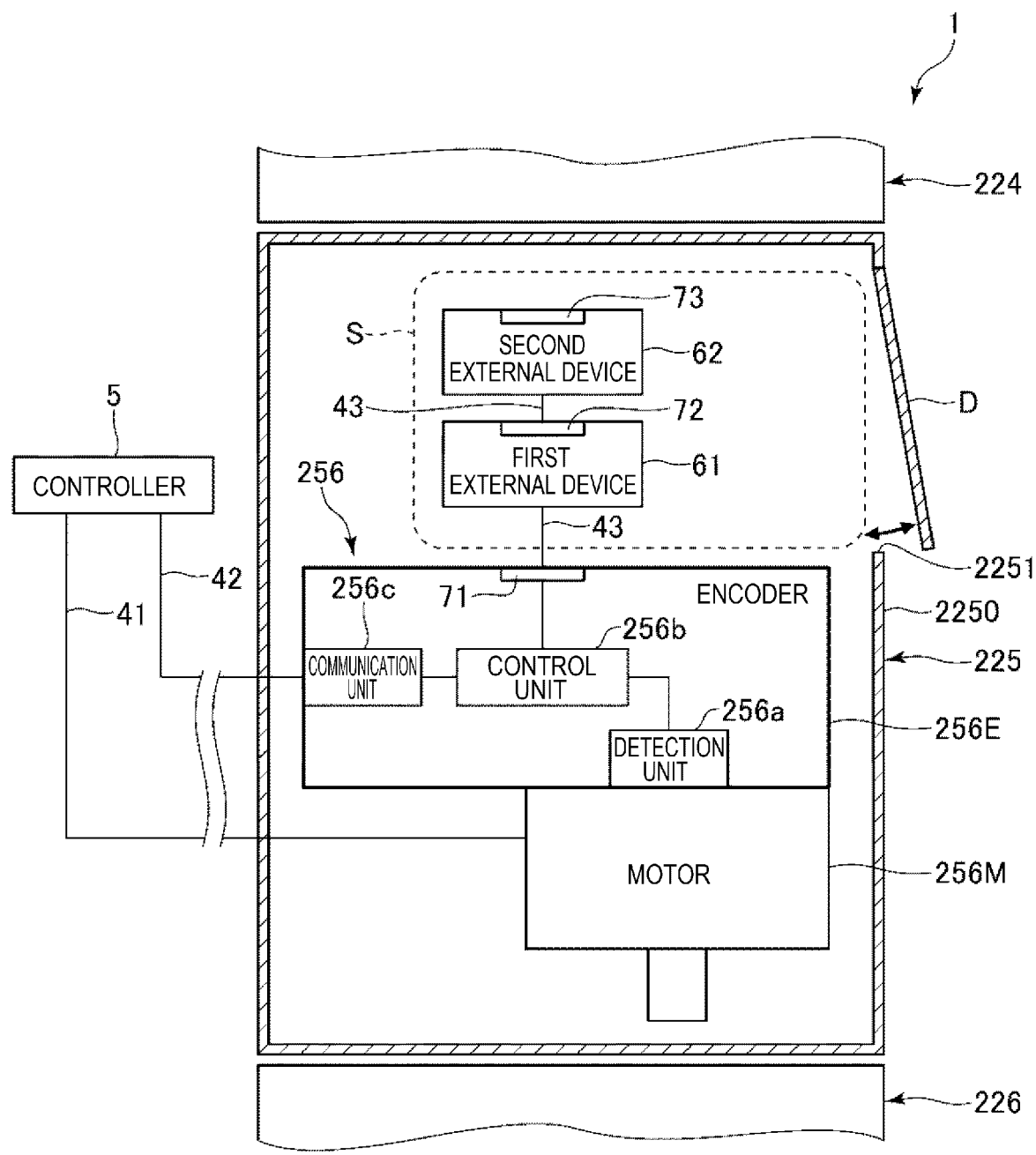
FIG. 3 is a partially enlarged view of the functional block diagram shown in FIG. 2.

FIG. 3 is the partially enlarged view of the functional block diagram shown in FIG. 2. Note that, in FIG. 3, configurations not shown in FIG. 2 are added.

The drive device 256 shown in FIG. 3 is provided inside of the arm 225 located between the arm 224 and the arm 226, and has the motor 256M and the encoder 256E as described above. Of the members, the encoder 256E includes a detection unit 256a that detects the amount of rotation of the motor 256M, a control unit 256b that controls the actuation of the detection unit 256a, and a communication unit 256c connected to the control unit 256b and communicating with the controller 5.

The detection unit 256a has e.g. a scale (not shown) coupled to the rotation shaft of the motor 256M and an optical element (not shown) reading the rotation of the scale, and outputs a signal according to an amount of rotation of the scale to the control unit 256b. Note that any method may be used as the detection method in the detection unit 256a.

The control unit 256b receives the signal output from the detection unit 256a and calculates the amount of rotation of the motor 256M. Then, the unit transmits data of the amount of rotation to the controller 5 via the communication unit 256c.

The communication unit 256c is inserted between the control unit 256b and the controller 5. The communication unit 256c receives the data of the amount of rotation output from the control unit 256b and converts the data into a signal according to a communication system applied to the first communication line 42. Then, the communication unit 256c transmits the converted signal to the controller 5 via the first communication line 42. Further, the communication unit 256c receives a signal containing a command for controlling the control unit 256b transmitted from the controller 5 and outputs the signal to the control unit 256b.

The communication system between the communication unit 256c and the controller 5 includes e.g. serial communication or parallel communication. Of the systems, the serial communication is preferably used. In the serial communication, data may be time-divisionally transmitted and received, and thus, the number of the first communication lines 42 may be reduced. Note that the serial communication may be synchronous communication or asynchronous communication.

Here, a unique ID (identification number) is assigned to the encoder 256E in advance. Thereby, in the communication, the transmission destination of the data may be designated and, even in the bus wiring, communication may be made individually between the encoder 256E and the controller 5.

The encoder 256E further has a first device connecting part 71 for connection of the first external device 61. The first device connecting part 71 is a port coupled to the control unit 256b for connecting the first external device 61. Further, the first device connecting part 71 is connected to the first external device 61 via a second communication line 43.

The first device connecting part 71 includes e.g. a connector, wire, and wireless communication device. Of the members, the first device connecting part 71 is preferably a connector or wire. The connection by the connector and the connection by the wire are detachable relatively easily, and thus, the second communication line 43 is easily connected and released. Accordingly, adding work of the first external device 61 may be efficiently performed. Further, the wired connection is useful in view of noise immunity and reliability.

Note that, when the first device connecting part 71 is a connector, the form of the first device connecting part 71 includes e.g. a board-mounted connector placed on a wiring board (not shown) on which the control unit 256b is mounted. Specifically, the part includes a parallel-connection connector, a vertical-connection connector, a horizontal-connection connector, a floating connector and the like. In addition, a USB (Universal Serial Bus) connector, an RS-232C connector, or the like may be employed.

On the other hand, when the first device connecting part 71 is a wire, the form of the first device connecting part 71 includes e.g. a form in which one end of the wire is coupled to a wiring board (not shown) on which the control unit 256b is mounted and the other end is free. Note that various types of connectors may be attached to both one end and the other end of the wire.

The first device connecting part 71 superimposes the communication by the first external device 61 with the controller 5 on the communication in the first communication line 42 through the control unit 256b and the communication unit 256c. That is, the encoder 256E according to the embodiment has a function of inserting the communication between the first external device 61 and the controller 5 into the communication between the communication unit 256c and the controller 5 via the first communication line 42. Thereby, it is not necessary to provide a communication line that directly connects between the first external device 61 and the controller 5. Therefore, if the first external device 61 is added, it is not necessary to increase the number of communication lines laid inside of the robot arm 22. As a result, the restriction on the design of the robot system 1, i.e., lowering of the degree of freedom of design may be prevented.

Specifically, between the communication unit 256c and the controller 5, the data from the detection unit 256a received by the control unit 256b is transmitted to the controller 5 as needed and, on the other hand, a command to control the actuation of the detection unit 256a is transmitted to the control unit 256b as needed. Note that the volume of the information of data, command and the like is not so large and there is room for the communication band.

Accordingly, in the encoder 256E according to the embodiment, information on the first external device 61 is inserted while information on the detection unit 256a is transmitted and received. Thereby, the first communication line 42 may be used not only for the communication between the encoder 256E and the controller 5, but for the communication between the first external device 61 and the controller 5. As a result, the communication between the first external device 61 and the controller 5 may be realized without increase in the number of first communication lines 42, and thus, lowering of the degree of freedom of design of the robot system 1 with addition of the first external device 61 and the second external device 62 may be prevented.

The first external device 61 that can be added in the above described manner includes e.g. a control device that controls an end effector such as a hand, suction pad, or dispenser and a control device that controls a sensor such as a force sensor, pressure sensor, or magnetic encoder. The form of these control devices includes e.g. a function enhancement board having a wiring board and electronic components mounted on the wiring board. Therefore, a space for placement of the control device including the function enhancement board, e.g. a rack for mounting board, a bracket for fixing board, or the like may be prepared inside of the arm 225.

Figure 4:
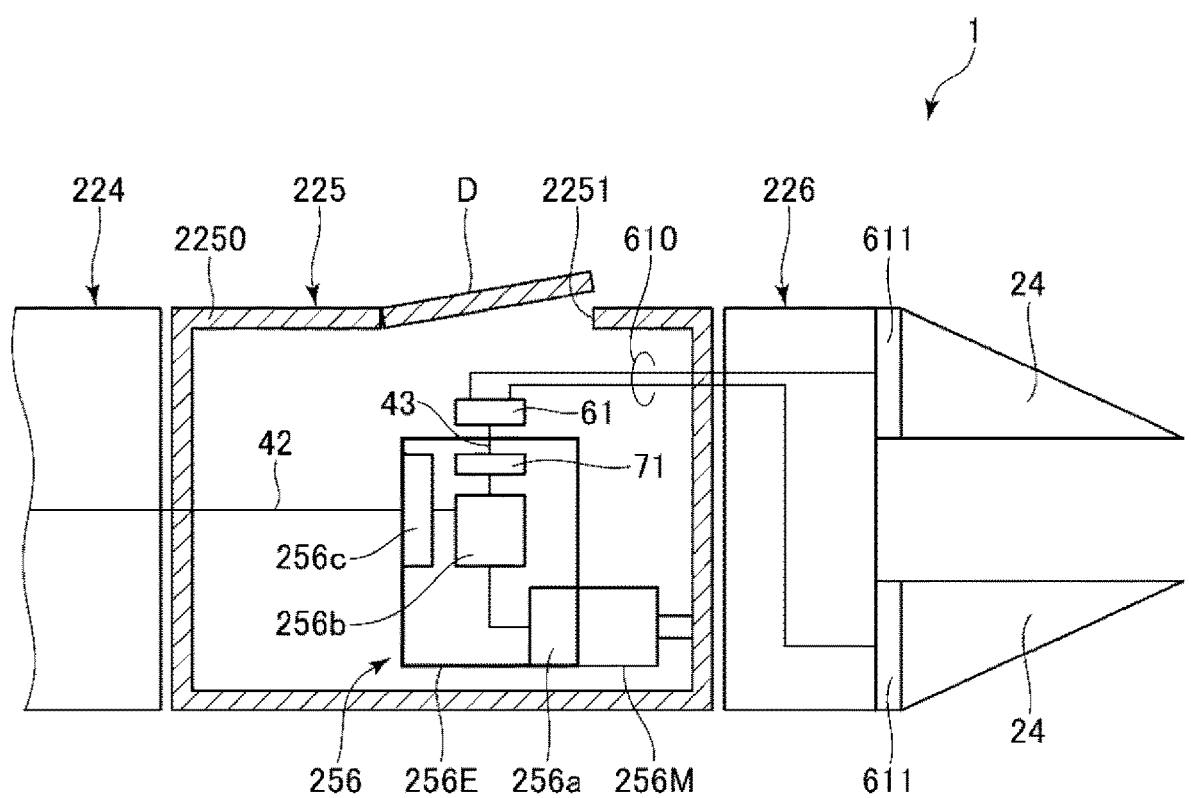
FIG. 4 is a functional block diagram showing an example in which a first external device shown in FIG. 3 is a control board for controlling a pressure detection unit of a pressure sensor.

Here, FIG. 4 is the functional block diagram showing the example in which the first external device 61 shown in FIG. 3 is the control board for controlling a pressure detection unit 611 of the pressure sensor. Note that, in FIG. 4, the second external device 62 is not shown for convenience of illustration.

The robot system 1 shown in FIG. 4 further has two pressure detection units 611 provided between the end effector 24 and the arm 226 and a wire 610 connecting the pressure detection units 611 and the first external device 61. The pressure detection unit 611 contains e.g. an elastic body having an electrical resistance that changes when subjected to pressure. Therefore, when an external force is applied to the end effector 24, the external force is also applied to the pressure detection units 611 and detected as a change in electrical resistance in the first external device 61. Therefore, the pressure detection units 611, the wire 610, and the first external device 61 function as a pressure sensor.

When the pressure sensor is added to the robot system 1, the first external device 61 and the controller 5 are not directly connected, but, in the embodiment, the first external device 61 and the first device connecting part 71 may be connected. Thereby, extension of the second communication line 43 may be made shorter, and the adding work may be easier and lowering of the degree of freedom of design of the robot system 1 with the addition may be prevented.

When the first external device 61 is a circuit board such as a function enhancement board, the second communication line 43 is not necessarily an elongated flexible wire or the like, but may be e.g. a terminal provided inside of a board-to-board connector or the like.

When the first device connecting part 71 is a wireless communication device, e.g. a wireless communication device compliant to a communication standard such as Bluetooth (registered trademark) or wireless LAN (Local Area Network) may be used. Thereby, the second communication line 43 may be unwired.

The communication system used for the second communication lines 43 includes e.g. serial communication or parallel communication, and the serial communication is preferably used. In the serial communication, data may be time-divisionally transmitted and received, and thus, even when the number of added external devices increases, it is not necessary to significantly increase the number of second communication lines 43. Accordingly, the wiring work of the second communication lines 43 is easier and the space necessary for routing of the second communication lines 43 may be saved.

Note that the communication system used for the second communication lines 43 may be the same as or different from the communication system used for the above described first communication lines 42. Further, the serial communication may be synchronous communication or asynchronous communication.

The first external device 61 has a second device connecting part 72 for connection of the second external device 62. The second device connecting part 72 is a port for connecting the second external device 62 and connected to the second external device 62 via the second communication line 43.

The configuration of the second device connecting part 72 is appropriately selected from the configurations of the above described first device connecting part 71, and may be the same as or different from the configuration of the first device connecting part 71.

Further, also, the second external device 62 is appropriately selected from the configurations of the first external device 61. Furthermore, the second external device 62 shown in FIG. 3 has a third device connecting part 73 for connection of another external device (not shown). The third device connecting part 73 is a port to which the other external device is connected, and connectable to the other external device via a communication line (not shown).

As described above, the robot system 1 according to the embodiment includes the robot 2, the controller 5 that controls the actuation of the robot 2, and the first external device 61. Further, the robot 2 has the arm 225 as a first member, the arm 226 as a second member that pivots relative to the arm 225, the motor 256M that generates drive power for pivoting the arm 226 relative to the arm 225, the encoder 256E including the detection unit 256a that detects the amount of rotation of the motor 256M, the control unit 256b that controls the actuation of the detection unit 256a, the communication unit 256c that communicates with the controller 5, the first device connecting part 71 connected to the first external device 61, the control unit 256b connected to the detection unit 256a, the communication unit 256c, and the first device connecting part 71, and the first communication line 42 connecting the communication unit 256c and the controller 5, and the robot transmits the data of the first external device 61 to the controller 5 via the first device connecting part 71 and the first communication line 42.

According to the above described robot system 1, the encoder 256E has the function of inserting the communication between the first external device 61 and the controller 5 into the communication between the communication unit 256c and the controller 5 via the first communication line 42 through the control unit 256b. Thereby, it is not necessary to provide a communication line that directly connects between the first external device 61 and the controller 5. As a result, if the first external device 61 is added, it is not necessary to increase the number of communication lines laid inside of the robot arm 22, and lowering of the degree of freedom of design of the robot system 1 may be prevented because the volume occupied by the communication lines is smaller.

The robot system 1 according to the embodiment further has the second external device 62 and the second device connecting part 72 connected to the second external device 62. In the embodiment, the encoder 256E, the first external device 61, and the second external device 62 are connected by the second communication lines 43 forming the bus wiring.

Specifically, in FIG. 3, the first device connecting part 71 and the first external device 61 are connected via the second communication line 43 and the second device connecting part 72 and the second external device 62 are connected via the second communication line 43. Therefore, in appearance, the so-called daisy-chain wiring is formed. On the other hand, electrically, the bus wiring connected by the main line extending from the first device connecting part 71 and the branch lines respectively branching to the first external device 61 and the second external device 62 from the main line is formed.

By the bus wiring, it is easier to arbitrarily add an external device. That is, in the bus wiring, in the wiring board (not shown) on which the control unit 256b is mounted or the like, the second external device 62 may be added without increase of another device connecting part than the first device connecting part 71. Therefore, it is not necessary to structurally change the wiring board or the like regardless of the number of added external devices. Accordingly, the adding work may be performed more easily. Further, upsizing of the wiring board with the control unit 256b mounted thereon may be prevented. As a result, the robot system 1 that can prevent increase in size and weight of the robot arm 22 with addition of external devices may be realized.

Note that the unique IDs (identification numbers) are respectively assigned to the first external device 61 and the second external device 62 in advance. Thereby, in the communication, the transmission destination of the data may be designated and, even in the bus wiring, communication may be made individually between the respective external devices and the control unit 256b and between the respective external devices and the controller 5.

As described above, the second device connecting part 72 shown in FIG. 3 is provided in the first external device 61. Thereby, in FIG. 3, in appearance, daisy-chain wiring can be employed and, electrically, as the bus wiring, the connecting work between the second device connecting part 72 and the second external device 62 may be easily performed. As a result, the robot system 1 in which external devices are easily added even when the number of added external devices increases may be realized.

Further, the arm 225 shown in FIG. 3 has a housing 2250. The above described drive device 256, the first external device 61, and the second external device 62 are housed inside of the housing 2250. The housing 2250 further has an opening part 2251 that enables access to the interior. The opening part 2251 is closed by a door D formed as an openable and closable part of the housing 2250. When the door D is opened, an internal space S shown in FIG. 3 may be easily accessed from outside. Therefore, the first external device 61 and the second external device 62 are provided in the internal space S, and thereby, the adding work of the first external device 61 and the second external device 62 may be performed without detachment of the housing 2250. Accordingly, the adding work may be performed more easily.

In other words, the encoder 256E is provided within the housing 2250 and the opening part 2251 is provided in a position corresponding to the first device connecting part 71. Thereby, the work of connecting the second communication line 43 to the first device connecting part 71 and releasing the connection may be easily performed from outside of the housing 2250. Note that the position corresponding to the first device connecting part 71 refers to a position in which wiring work may be performed on the first device connecting part 71 from outside of the housing 2250 via the opening part 2251.

Note that it is only necessary that the robot system 1 has at least the first device connecting part 71 that enables addition of the first external device 61 and the first external device 61, and the second external device 62 is not necessarily provided. Further, the number of external devices that can be added is not limited to two, but may be one, three, or more.

In the above description, the arm 225 is "first member" and the second arm 226 is "second member that pivots relative to the first member", however, the first member and the second member are not limited to those. In the case of the embodiment, any one of the base 21 and the arms 221 to 225 may serve as the first member. Further, any one of the arms 221 to 226 adjacent to the first member may serve as the second member.

Both the first external device 61 and the second external device 62 are not necessarily provided within the housing 2250, and at least one of the devices may be provided outside of the housing 2250. For example, when the first external device 61 is provided outside, the first device connecting part 71 may be provided in a position exposed to outside of the housing 2250.

First Modified Example

Here, a first modified example of the first embodiment is explained.

Figure 5:
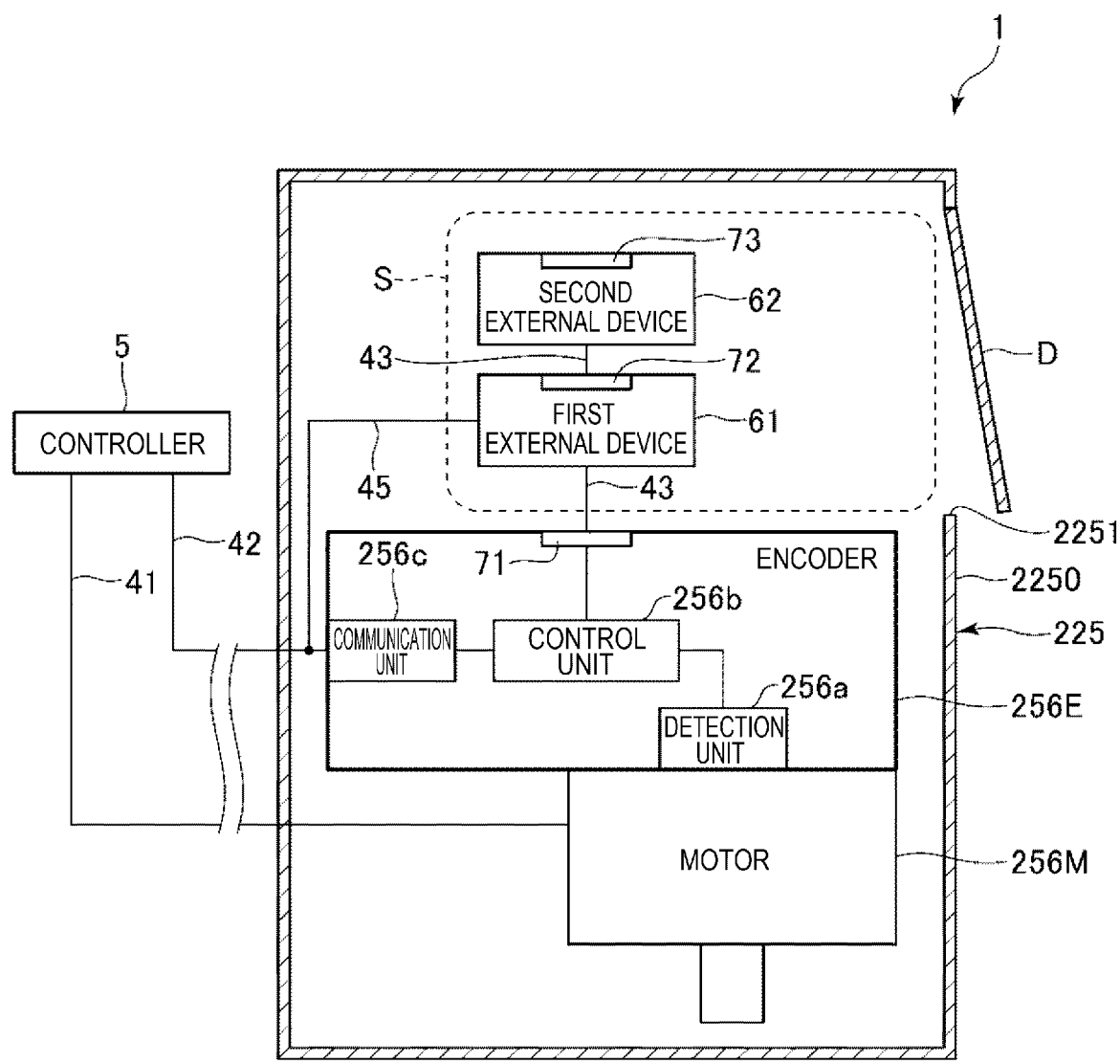
FIG. 5 is a functional block diagram showing a robot system according to a first modified example of the first embodiment.

FIG. 5 is the functional block diagram showing the robot system according to the first modified example of the first embodiment.

As below, the first modified example will be explained with a focus on the differences from the first embodiment and the explanation of the same items will be omitted. Note that, in FIG. 5, the same configurations as those of the first embodiment have the same signs.

The robot system 1 shown in FIG. 5 further has a branch communication line 45 connecting the first external device 61 and the first communication line 42. That is, the first external device 61 is connected to the branch communication line 45 branching from the first communication line 42. Thereby, the first external device 61 can make not only the communication via the second communication line 43 and the first communication line 42 but also communication via the branch communication line 45 and the first communication line 42. Accordingly, communication may be provided with redundancy. That is, if the first device connecting part 71 and the second communication line 43 have trouble, the communication between the first external device 61 and the controller 5 may be secured. Note that the branch communication line 45 may be connected to the second external device 62.

In the robot system 1, the branch communication line 45 may be provided in advance in anticipation of addition of the first external device 61 and the second external device 62.

Second Modified Example

Next, the robot system according to a second modified example of the first embodiment is explained.

Figure 6:
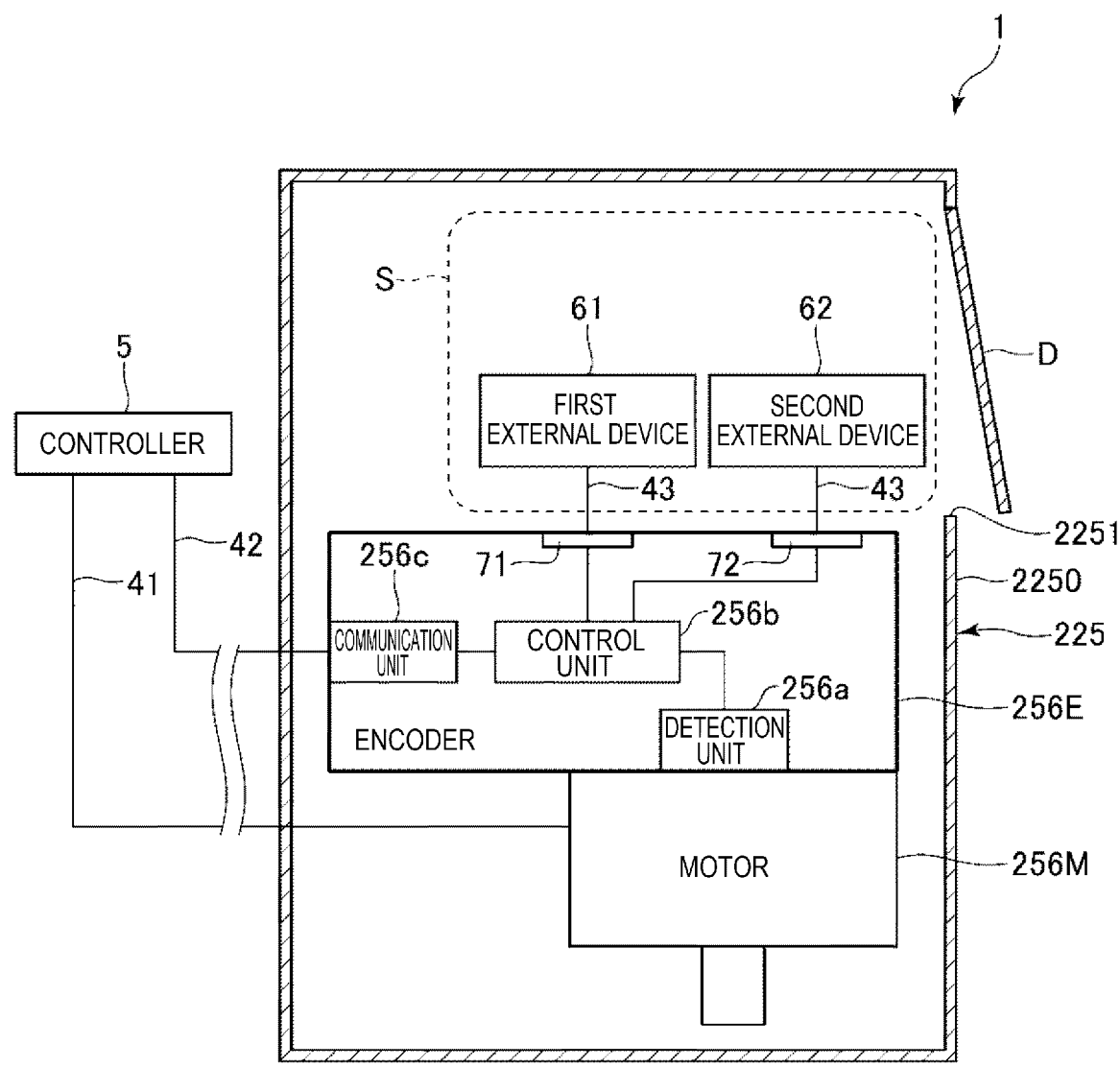
FIG. 6 is a partially enlarged view of a functional block diagram showing a robot system according to a second modified example of the first embodiment.

FIG. 6 is the partially enlarged view of the functional block diagram showing the robot system according to the second modified example of the first embodiment.

As below, the second modified example will be explained with a focus on the differences from the first embodiment and the explanation of the same items will be omitted. Note that, in FIG. 6, the same configurations as those of the first embodiment have the same signs.

In the above described first embodiment, the second communication lines 43 form the bus wiring, however, in the second modified example, the second communication lines 43 form star wiring. That is, the robot system 1 according to the second modified example further includes the second external device 62. The encoder 256E of the robot system 1 according to the second modified example further has the second device connecting part 72 for connection of the second external device 62. The second device connecting part 72 is contained in the encoder 256E and connected to the control unit 256b. The encoder 256E and the first external device 61 and second external device 62 are connected by the second communication lines 43 forming the star wiring.

Specifically, the encoder 256E according to the second modified example further has the second device connecting part 72 connected to the control unit 256b in parallel to the first device connecting part 71. Further, the second external device 62 is connected to the second device connecting part 72 via the second communication line 43. Thereby, the plurality of second communication lines 43 may be provided in parallel. Accordingly, even when the communication capacity of the second communication lines 43 is smaller or even when the volume of data transmitted and received by the first external device 61 and the second external device 62 is larger, an external device can be added.

Third Modified Example

Next, the robot system according to a third modified example of the first embodiment is explained.

Figure 7:
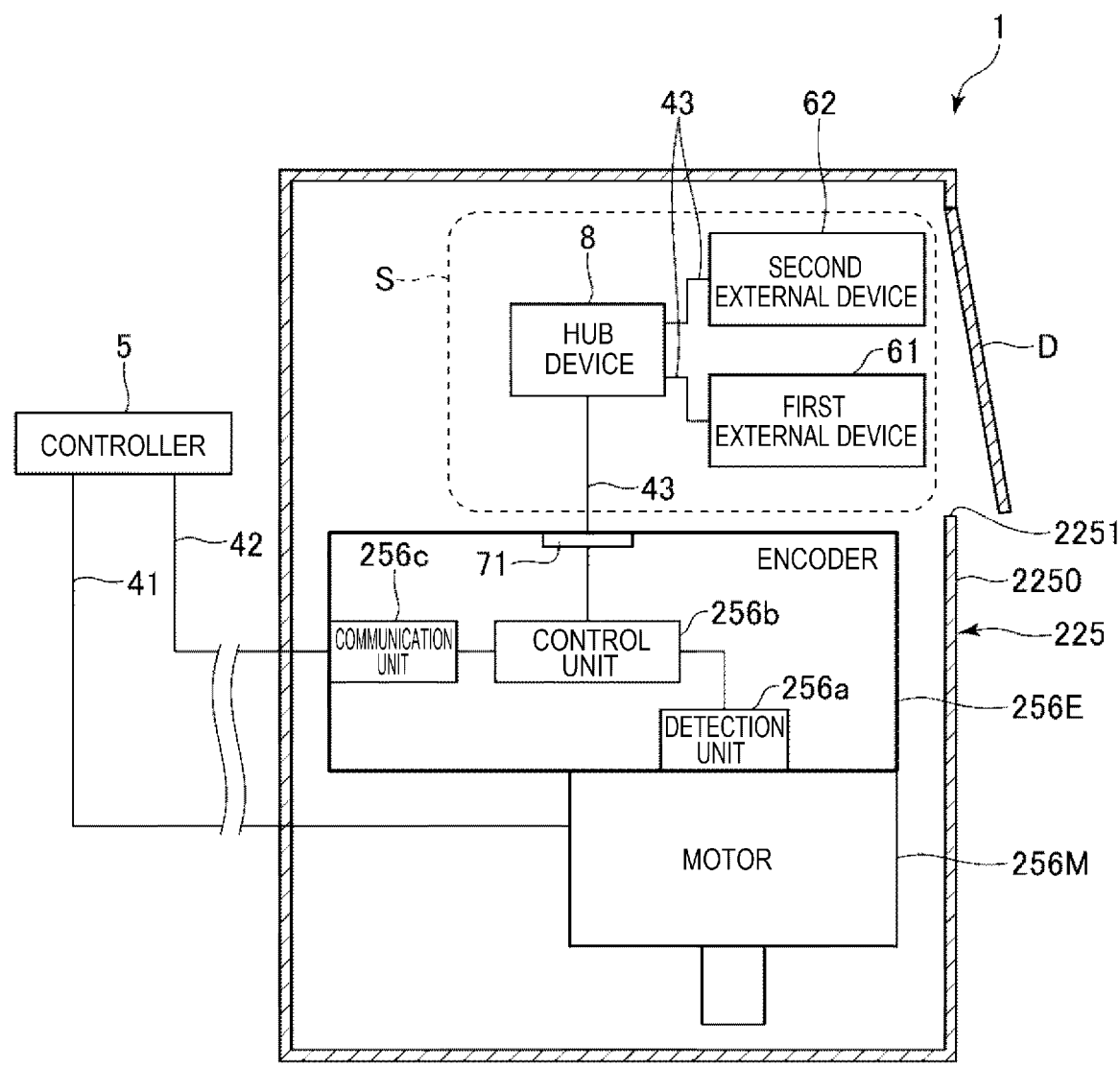
FIG. 7 is a partially enlarged view of a functional block diagram showing a robot system according to a third modified example of the first embodiment.

FIG. 7 is the partially enlarged view of the functional block diagram showing the robot system according to the third modified example of the first embodiment.

As below, the third modified example will be explained with a focus on the differences from the first embodiment and the explanation of the same items will be omitted. Note that, in FIG. 7, the same configurations as those of the first embodiment have the same signs.

The robot system 1 according to the third modified example has a hub device 8 provided within the housing 2250. The hub device 8 is a branching device that branches the second communication line 43 into a plurality of lines. The first external device 61 and the second external device 62 are connected to the branched second communication lines 43. The hub device 8 is used, and thereby, adding work may be performed more easily.

Second Embodiment

Next, the robot system according to a second embodiment will be explained.

Figure 8:
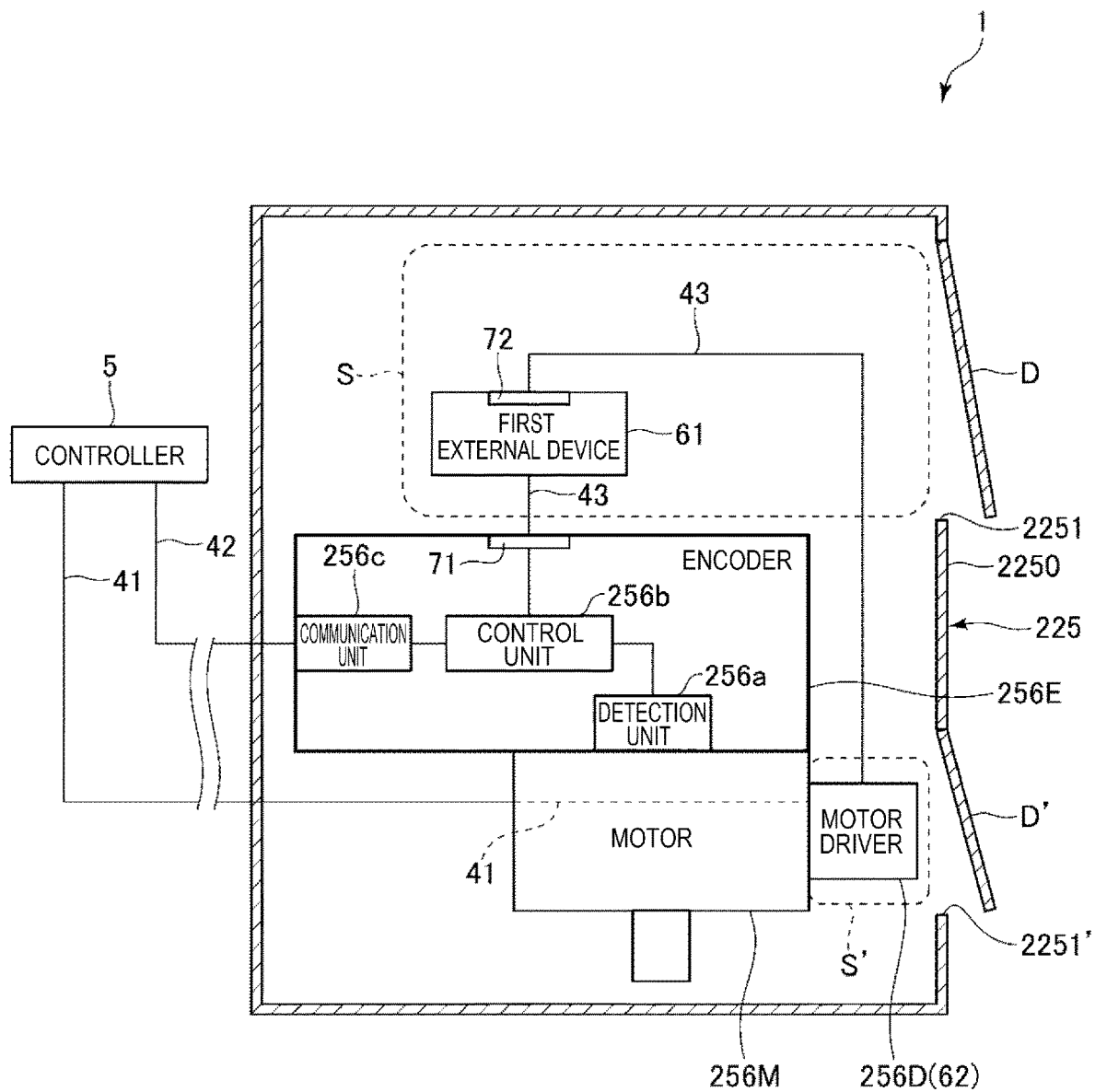
FIG. 8 is a partially enlarged view of a functional block diagram showing a robot system according to a second embodiment.
Figure 9:
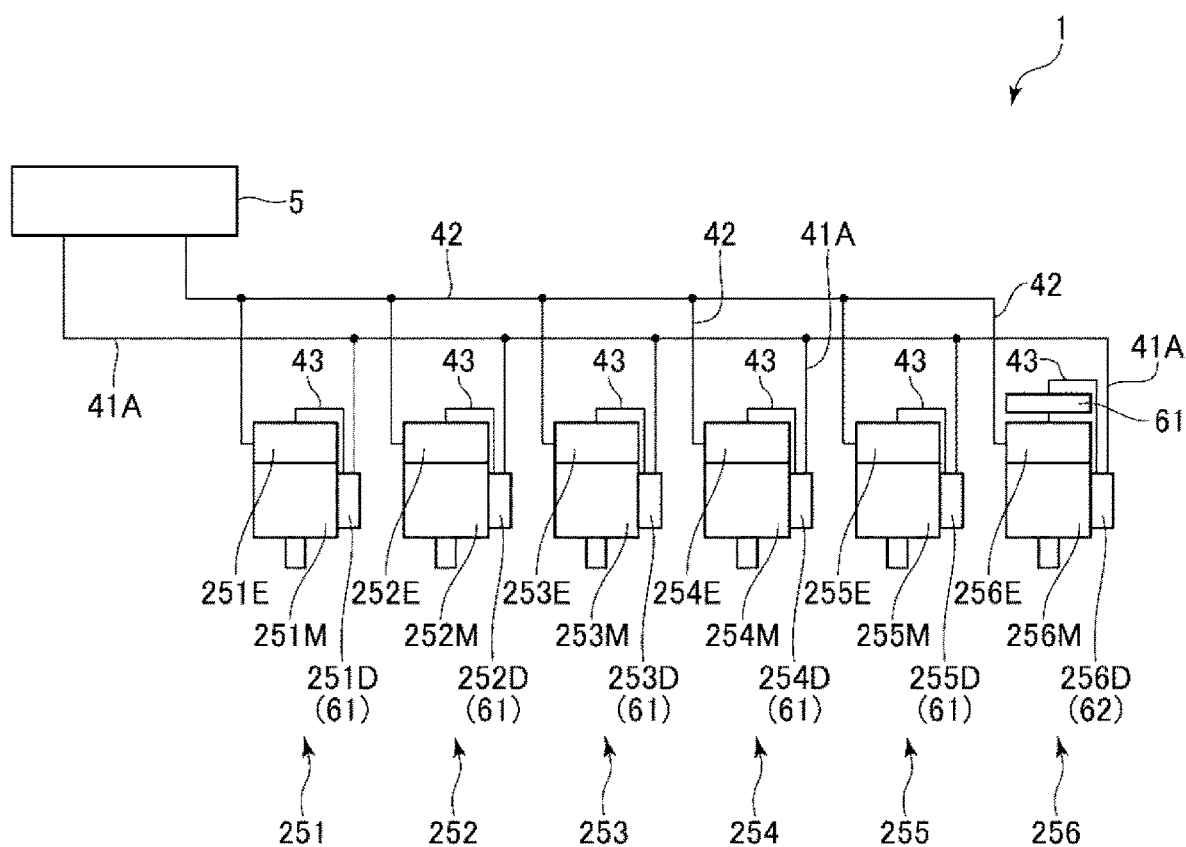
FIG. 9 is a general view of the functional block diagram showing the robot system according to the second embodiment.

FIG. 8 is the partially enlarged view of the functional block diagram showing the robot system according to the second embodiment. FIG. 9 is the general view of the functional block diagram showing the robot system according to the second embodiment.

As below, the second embodiment will be explained with a focus on the differences from the first embodiment and the explanation of the same items will be omitted. Note that, in FIGS. 8 and 9, the same configurations as those of the first embodiment have the same signs.

As shown in FIG. 8, the robot system 1 according to the second embodiment has a motor driver 256D as the second external device 62 provided in the housing 2250. The motor driver 256D controls a current applied to the motor 256M in a drive method such as square-wave drive of flowing a current in a square waveform or sinusoidal-wave drive of flowing a current in a sinusoidal waveform. The motor driver 256D is provided for the motor 256M, and thereby, the power lines 41 forming the star wiring like the first embodiment may be changed to power lines 41A forming bus wiring as shown in FIG. 9. As a result, the number of the power lines 41 passing through the robot arm 22 shown in FIG. 1 may be reduced and the degree of freedom of design of the robot system 1 may be made higher.

Further, in the embodiment, the same devices as the motor driver 256D as the external device are respectively provided for the respective motors 251M to 256M. Specifically, the robot system 1 shown in FIG. 9 further has a motor driver 251D provided for the motor 251M of the drive device 251, a motor driver 252D provided for the motor 252M of the drive device 252, a motor driver 253D provided for the motor 253M of the drive device 253, a motor driver 254D provided for the motor 254M of the drive device 254, a motor driver 255D provided for the motor 255M of the drive device 255, and the motor driver 256D provided for the motor 256M of the drive device 256. The motor drivers 251D to 256D are individually provided, and thereby, a common direct-current voltage may be applied to the respective motor drivers 251D to 256D and, even when the power lines 41A forming the bus wiring are used, driving of the respective motors 251M to 256M may be individually controlled.

Further, in the robot system 1 shown in FIG. 9, the motor drivers 251D to 255D correspond to first external devices 61 added to the encoders 251E to 255E, and the motor driver 256D corresponds to the second external device 62 added to the encoder 256E. The motor drivers 251D to 256D are provided as the first external devices 61 or the second external device 62, and thereby, the communication between the motor drivers 251D to 256D and the controller 5 may be superimposed on the communication in the first communication lines 42. Therefore, it is not necessary to provide communication lines that directly connect the motor drivers 251D to 256D and the controller 5 or increase the number of communication lines laid inside of the robot arm 22.

As shown in FIG. 8, the housing 2250 further has an opening part 2251' that enables access to an inner space S' in which the motor driver 256D is located. The opening part 2251' is closed by a door D' formed as an openable and closable part of the housing 2250. When the door D' is opened, the internal space S' shown in FIG. 8 may be easily accessed from outside.

Third Embodiment

Next, the robot according to a third embodiment will be explained.

Figure 10:
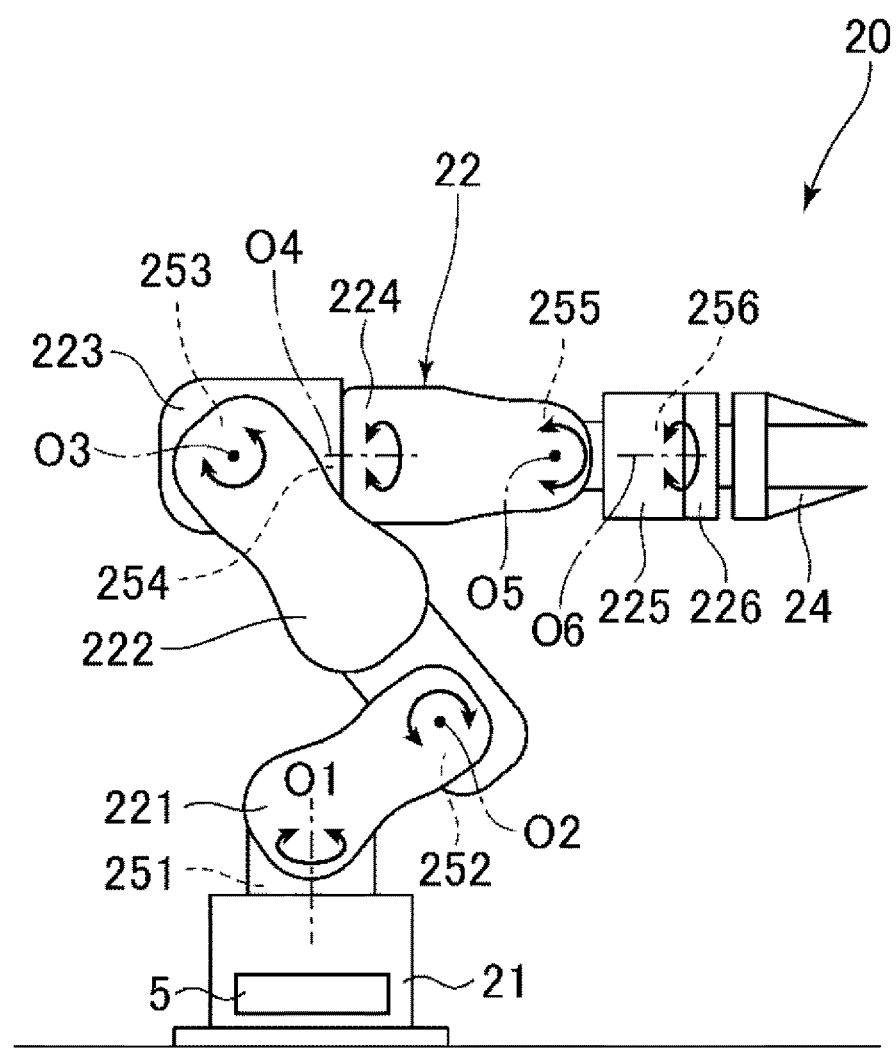
FIG. 10 is a side view showing a robot according to a third embodiment.

FIG. 10 is the side view showing the robot according to the third embodiment.

As below, the third embodiment will be explained with a focus on the differences from the first embodiment and the explanation of the same items will be omitted. Note that, in FIG. 10, the same configurations as those of the first embodiment have the same signs.

A robot 20 according to the third embodiment is the same as the robot system 1 according to the first embodiment except that the controller 5 controlling driving thereof is provided inside of the base 21. That is, the controller 5 is provided outside of the housing of the robot 2 in the robot system 1 according to the first embodiment and, on the other hand, the robot 20 according to the embodiment has the controller 5 inside. Accordingly, the robot 20 may control driving of itself.

Further, the robot 20 according to the embodiment also includes the base 21 and the robot arm 22 and has the same configurations as those of the robot system 1 according to the first embodiment.

That is, like the robot system 1 shown in FIGS. 1 to 3, the robot 20 according to the embodiment includes the controller 5, the first external device 61, the arm 225 as the first member, the arm 226 as the second member that pivots relative to the arm 225, the motor 256M that generates drive power for pivoting the arm 226 relative to the arm 225, the encoder 256E including the detection unit 256a that detects the amount of rotation of the motor 256M, the control unit 256b that controls the actuation of the detection unit 256a, the communication unit 256c that communicates with the controller 5, and the first device connecting part 71 connected to the first external device 61, as shown in FIG. 3, the control unit 256b connected to the detection unit 256a, the communication unit 256c, and the first device connecting part 71, and the first communication line 42 connecting the communication unit 256c and the controller 5, and the robot transmits the data of the first external device 61 to the controller 5 via the first device connecting part 71 and the first communication line 42.

According to the above described robot 20, the encoder 256E has the function of inserting the communication between the first external device 61 and the controller 5 into the communication between the communication unit 256c and the controller 5 via the first communication line 42 through the control unit 256b shown in FIG. 3. Thereby, it is not necessary to provide a communication line that directly connects between the first external device 61 and the controller 5. As a result, if the first external device 61 is added, it is not necessary to increase the number of communication lines laid inside of the robot arm 22, and lowering of the degree of freedom of design of the robot 20 may be prevented.

As above, the robot system and robot according to the present disclosure are explained with reference to the illustrated embodiments, however, the present disclosure is not limited to those. The configurations of the respective parts may be replaced by arbitrary configurations having the same functions. Further, another arbitrary configuration may be added to the above described embodiments. Furthermore, two of the above described embodiments may be combined.

What is claimed is:

1. A robot system comprising:
   a robot;
   a controller that controls actuation of the robot;
   a first external device;
   a second external device, and
   a second device connecting part connected to the second external device,
   wherein
   the robot has
      a first member,
      a second member that pivots relative to the first member,
      a motor that generates drive power for pivoting the second member relative to the first member,
      an encoder including a detection unit that detects an amount of rotation of the motor, a control unit that controls actuation of the detection unit, a communication unit that communicates with the controller, and a first device connecting part connected to the first external device, the control unit connected to the detection unit, the communication unit, and the first device connecting part, and
      a first communication line connecting the communication unit and the controller,
   wherein data of the first external device is transmitted to the controller via the first device connecting part and the first communication line,
   the encoder, the first external device, and the second external device are connected by wiring, and
   the second device connecting part is provided in the first external device.

2. The robot system according to claim 1, wherein the first external device is connected to a branch communication line branching from the first communication line.

3. The robot system according to claim 1, wherein a communication system between the communication unit and the controller is serial communication.

4. A robot comprising:
   a controller;
   a first external device;
   a second external device;
   a second device connecting part connected to the second external device;
   a first member;
   a second member that pivots relative to the first member;
   a motor that generates drive power for pivoting the second member relative to the first member;
   an encoder including a detection unit that detects an amount of rotation of the motor, a control unit that controls actuation of the detection unit, a communication unit that communicates with the controller, and a first device connecting part connected to the first external device, the control unit connected to the detection unit, the communication unit, and the first device connecting part; and a first communication line connecting the communication unit and the controller, the robot transmitting data of the first external device to the controller via the first device connecting part and the first communication line, wherein the encoder, the first external device, and the second external device are connected by wiring, and the second device connecting part is provided in the first external device.

\* \* \* \* \*